US009177090B1

(12) United States Patent
    Tzeng (10) Patent No.: US 9,177,090 B1
(45) Date of Patent: Nov. 3, 2015

(54) IN-HIERARCHY CIRCUIT ANALYSIS AND MODIFICATION FOR CIRCUIT INSTANCES

(71) Applicant: Atoptech, Inc., Santa Clara, CA (US)

(72) Inventor: Ping-San Tzeng, Fremont, CA (US)

(73) Assignee: Atoptech, Inc., Santa Clara, CA (US)

( * ) Notice: Subject to any disclaimer, the term of this patent is extended or adjusted under 35 U.S.C. 154(b) by 0 days.

(21) Appl. No.: 14/483,040

(22) Filed: Sep. 10, 2014

Related U.S. Application Data (63) Continuation-in-part of application No. 14/313,875, filed on Jun. 24, 2014, which is a continuation of application No. 13/971,666, filed on Aug. 20, 2013, now Pat. No. 8,793,633, which is a continuation of application No. 12/871,734, filed on Aug. 30, 2010, now Pat. No. 8,566,765.

(51) Int. Cl.
    *G06F 9/455*     (2006.01)
    *G06F 17/50*    (2006.01)
(52) U.S. Cl.
    CPC .................................. *G06F 17/505* (2013.01)

(58) Field of Classification Search
    USPC ......................................................... 716/134
    See application file for complete search history.

(56) References Cited

U.S. PATENT DOCUMENTS

| 6,080,201 A | 6/2000 | Hojat et al. | |
|---|---|---|---|
| 6,704,697 B1* | 3/2004 | Berevoescu et al. | 703/19 |
| 2006/0031803 A1* | 2/2006 | Eichenseer et al. | 716/10 |

* cited by examiner

*Primary Examiner* — Eric Lee
(74) *Attorney, Agent, or Firm* — Van Pelt, Yi & James LLP (57) ABSTRACT

Modifying a hierarchical circuit design includes accessing hierarchical circuit data in a hierarchical circuit design comprising top level block data and lower level block data; performing timing analysis on a selected portion of the hierarchical circuit data to determine whether timing closure is achieved; and in the event that timing closure is not achieved, determining, within a top level design process, an optimization move on the selected portion of the hierarchical circuit data; wherein the selected portion of the hierarchical circuit data includes a selected portion of the top level block data and a selected portion of the lower level block data.

21 Claims, 10 Drawing Sheets

IN-HIERARCHY CIRCUIT ANALYSIS AND MODIFICATION FOR CIRCUIT INSTANCES

CROSS REFERENCE TO OTHER APPLICATIONS

This application is a continuation-in-part of co-pending U.S. patent application Ser. No. 14/313,875 entitled IN-HIERARCHY CIRCUIT ANALYSIS AND MODIFICATION filed Jun. 24, 2014, which is incorporated herein by reference in its entirety for all purposes, which is a continuation of U.S. patent application Ser. No. 13/971,666, now U.S. Pat. No. 8,793,633, entitled IN-HIERARCHY CIRCUIT ANALYSIS AND MODIFICATION filed Aug. 20, 2013 which is incorporated herein by reference for all purposes, which is a continuation of U.S. patent application Ser. No. 12/871,734, now U.S. Pat. No. 8,566,765, entitled IN-HIERARCHY CIRCUIT ANALYSIS AND MODIFICATION filed Aug. 30, 2010 which is incorporated herein by reference in its entirety for all purposes.

BACKGROUND OF THE INVENTION

Electronic design automation (EDA) technology is becoming increasingly sophisticated, allowing circuit designers to create highly complex integrated circuits with greater functionality and better performance.

The place and route (P&R) stage of circuit design typically involves multiple steps. The typical P&R tool first partitions design data (e.g., netlist) into a top level design and many block-level designs, outputting block-level circuit descriptions as Design Exchange Format (DEF) files. Boundary/timing constraints of the blocks are generated in standard formats such as Synopsis Design Constraints (SDC). Individual blocks are then flattened and processed by a block level P&R engine designed to process flat, non-hierarchical circuit blocks. The timing of individual blocks is obtained based on analysis by the block level engine. A block may be assigned a certain timing budget such as maximum/minimum input/output delays. The block-level P&R engine would find the optimal placement and routing implementation for the block designs, while ensuring all block-level timing budgets are met. After the block-level P&R, the block designs are translated into an abstract representation with necessary timing and physical boundary information, before they are incorporated into the top level design. If any of the block-level I/O budget is not met, the corresponding inter-block timing path may not reach closure. In such case, the blocks involved in the critical timing path will need to be re-budgeted. New SDC files will need to be regenerated and block-level P&R will need to be refined. This iterative process goes on until all block-level and inter-block timings are closed.

A number of issues exist in the typical P&R process. Since the process is broken down into several steps involving different data representations, data management is complex, expensive, and error-prone. The top level and the block level are processed using separate engines, which can lead to timing correlation and tool compatibility problems. Since the top level designers and block level designers typically only have access to data for their respective levels, the assignment and modification of timing budgets tend to be inflexible. Also, the process usually goes through multiple iterations that require extensive coordination between block level and top level designers. For example, the designers usually have to exchange modified data by exporting and importing different files and merge modified data into the overall design. As a result, the turn-around time required to achieve timing closure is often lengthy.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Modifying a hierarchical circuit design to achieve timing closure is disclosed. The hierarchical design includes multiple circuit blocks arranged in a hierarchical structure. In some embodiments, timing analysis and modifications are performed on selected circuit data, such as selected portions of the top level data and the block level data, to achieve inter-block timing closure. In some embodiments, the selected circuit data includes boundary path data, i.e., inter-block paths that extend across block boundaries. Further timing analysis and modification are performed on the block level data, while accounting for modifications made on the selected circuit data, such as the boundary paths, to achieve intra-block timing closure.

Figure 1A:
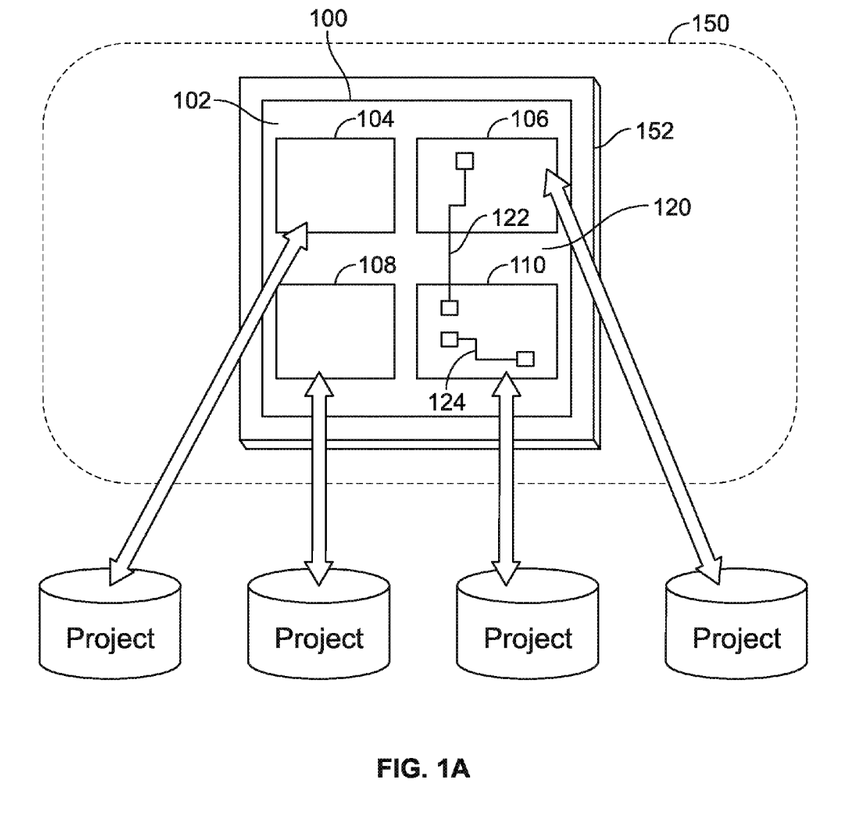
FIG. 1A is a diagram illustrating an embodiment of a data model used in a place and route process.

FIG. 1A is a diagram illustrating an embodiment of a data model used in a place and route process. In the example shown, data in a hierarchical circuit design 100 is processed. Data associated with components from different hierarchical levels are loaded by a top level process 150 into memory 152. Each hierarchical component is treated as a container of information that may include subcontainers corresponding to components at a lower level in the hierarchy. For example, container 102, which stores top level chip assembly data such as top level assembly information of a graphic chip, includes subcontainers 104-110 storing block level data of circuit component blocks such as an input/output circuit, digital signal processor, etc. Additional hierarchical levels and containers may be included in other designs. A single unified project file format is used for importing and exporting the design data, thus achieving a homogenous design environment.

In some embodiments, the circuit data includes netlists of circuit components and routing information. RC information (i.e., resistance and capacitance information) is derived from routing information. During the P&R process, the hierarchical data structure is maintained. In other words, as shown in this example, the top level process retains the structures for the top level container and the subcontainers and tracks the block boundaries, even though portions of the block level data from the subcontainers can be selected, flattened and placed in the top level container for the top level process to perform analysis and make modifications. Because the hierarchical structure and the boundary information are maintained throughout, changes made to top level and/or lower level block data by the top level process can be put back into the respective containers, without requiring manual manipulation. This technique, referred to as in-hierarchy P&R, allows timing analyses and modifications to be made directly by the top level process to achieve both block level and top level timing closure.

Figure 1B:
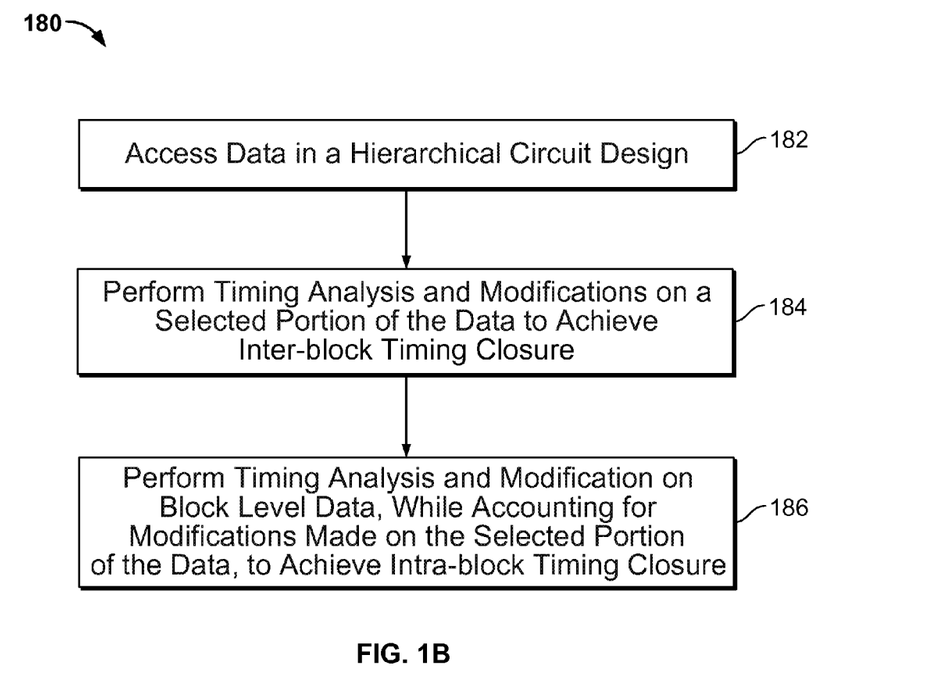
FIG. 1B is a flowchart illustrating an embodiment of an in-hierarchy place and route process.

FIG. 1B is a flowchart illustrating an embodiment of an in-hierarchy place and route process. Process 180 may be performed on a computer system or any other appropriate device.

At 182, hierarchical circuit data is accessed in a hierarchical circuit design. Referring to FIG. 1A, for a hierarchical circuit design example, hierarchical data that is accessed includes block level data within lower level blocks (such as regions 104-110) and top level data that lies only within the top level block (such as region 120). Netlist, routing, and/or RC data may be accessed. In some embodiments, the data is stored as project files in a storage location and is read from the storage location into memory. The hierarchical data structure is maintained.

The typical P&R process includes the main stages of floor planning, block-level design, and chip assembly. The timing constraints within individual circuit blocks are usually met during design stages prior to the final assembly stage in the P&R process. Block level designers, however, often do not have visibility into areas outside the blocks they have designed and, therefore, cannot easily control the timing of these parts. Consequently, delays attributed to the inter-block paths can often cause the overall timing of the chip to exceed budget. As used herein, inter-block paths (also referred to as boundary paths) are paths that extend across the boundaries of individual blocks (e.g., path 122 of FIG. 1A), and intra-block paths refer to paths that lie entirely within individual blocks (e.g., path 124 of FIG. 1A). At 184, timing analysis and circuit modifications are performed on a selected portion of the hierarchical data to achieve inter-block timing closure. In some embodiments, inter-block timing closure is achieved based on inter-block paths by applying timing analysis and circuit adjustments on selected portions of inter-block netlists, routing, and/or RC data. Inter-block timing closure is achieved iteratively in some embodiments, and the details of which are described below.

The modifications to the inter-block paths may affect the timing of intra-block paths. Thus, at 186, intra-block timing closure is achieved by performing timing analysis and modifications on the block level data, while accounting for previously made modifications to the selected portions of data. Intra-block timing closure is achieved iteratively in some embodiments, and the details of which are described below.

In some embodiments, steps in the P&R process are carried out by the same top level design process executing on the system, and no additional exporting/importing of data is required between analysis and modification stages. Since the modifications are made by the top level design process directly, no ECO (Engineering Change Order) to the block designer is required and the turn-around time between iterations is greatly reduced.

Figure 2:
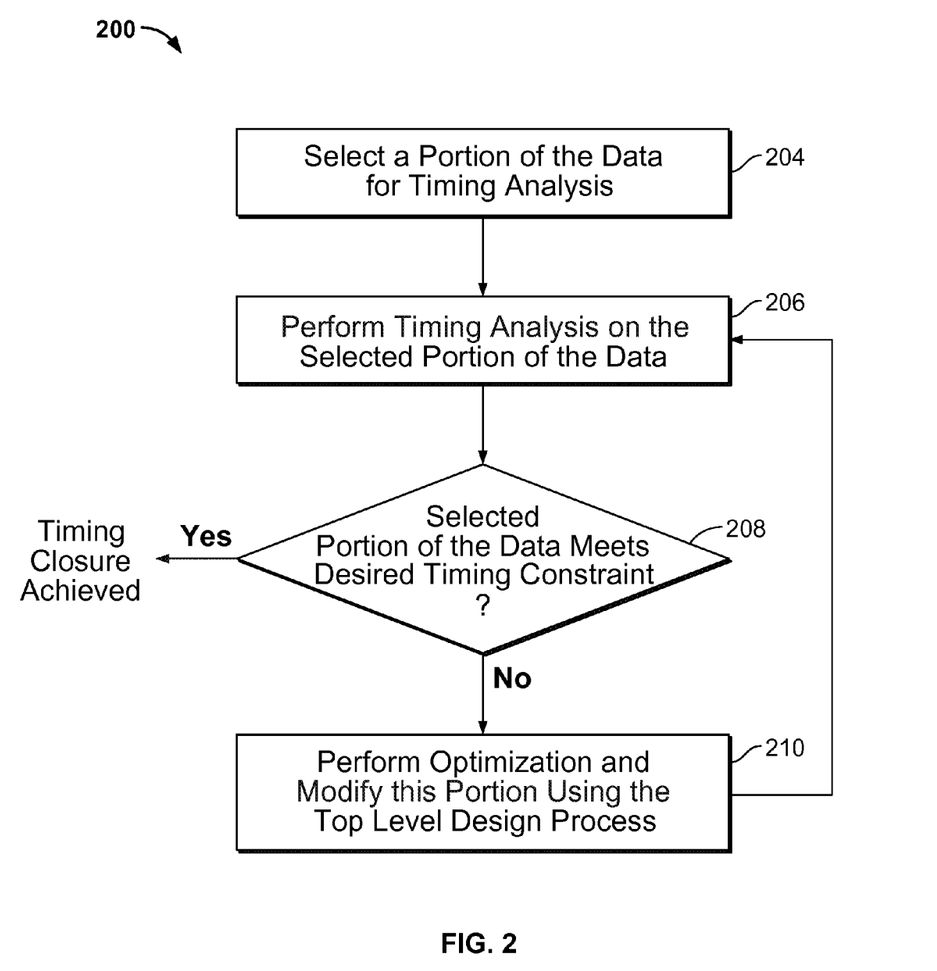
FIG. 2 is a flowchart illustrating an embodiment of an in-hierarchy place and route process for achieving inter-block timing closure.

FIG. 2 is a flowchart illustrating an embodiment of an in-hierarchy place and route process for achieving inter-block timing closure. Process 200 may be performed on a computer system or any other appropriate device and can be used to implement 184 of process 180.

Assuming that circuit data in a hierarchical circuit design has already been accessed, at 204, a portion of the data is selected for timing analysis.

In some embodiments, the selected data includes all of the top level block data and selected portions of the lower level block data. Various portions of the circuit are assigned respective desired timing constraints (also referred to as timing budgets). Timing analysis is performed to determine whether the circuit portions achieve the timing constraints. During a typical design process, the timing constraints within individual circuit component blocks are usually met during block design stages prior to the final assembly stage in the P&R process. Block level designers, however, often do not have visibility into areas outside the blocks they have designed, and therefore cannot easily control the timing budget of these parts. Consequently, delays attributed to the boundary path can often cause the overall timing of the chip to exceed budget. Thus, in some embodiments, boundary netlist data is selected and placed in the top level container to be used by the top level process, and the timing analysis is focused on these regions instead of the entire chip to achieve greater computational efficiency. An example of how to select the portion for timing analysis is described in greater detail below in connection with FIGS. 3A-3B.

In some embodiments, the selected portion of data is stored in more expensive low latency memory (such as random access memory (RAM)) for the analysis, and the rest of the data, which is not used for the analysis, is swapped into higher latency memory (such as virtual memory or disk memory).

At 206, timing analysis is performed on the selected data. Here, the timing analysis is based on the netlist corresponding to the selected portion. Static Timing Analysis (STA), RC analysis, and/or any other appropriate timing analysis techniques may be employed.

At 208, the timing analysis result is used to determine whether the selected portion of the hierarchical data meets the desired timing constraint (also referred to as top level SDC). If so, inter-block timing closure is achieved for this portion. If, however, the desired timing constraint is not met, at 210, circuit optimization is performed on the selected portion and the selected portion is modified by the top level design process as a result of the optimization. A number of standard optimization techniques can be used where the selected circuit portion of the circuit and the corresponding timing constraint are entered as inputs, and modifications to the inputted circuit that would satisfy the timing constraints are generated as outputs. The optimization can result in a variety of modifications (also referred to as logical fixes) for adjusting timing. For example, buffers can be added and gate size can be changed to improve timing. A subsequent P&R fixing step will modify each block level layout to realize those logical fixes physically, according to the design rules.

After the selected portion has been modified, control is returned to 206 and timing analysis is performed again on the modified selected portion. The analysis result is once again compared with the desired timing constraint at 208, and further optimization and modification are performed at 210 as needed. 206-210 may be iterated several times until inter-block timing closure is achieved.

Figure 3A:
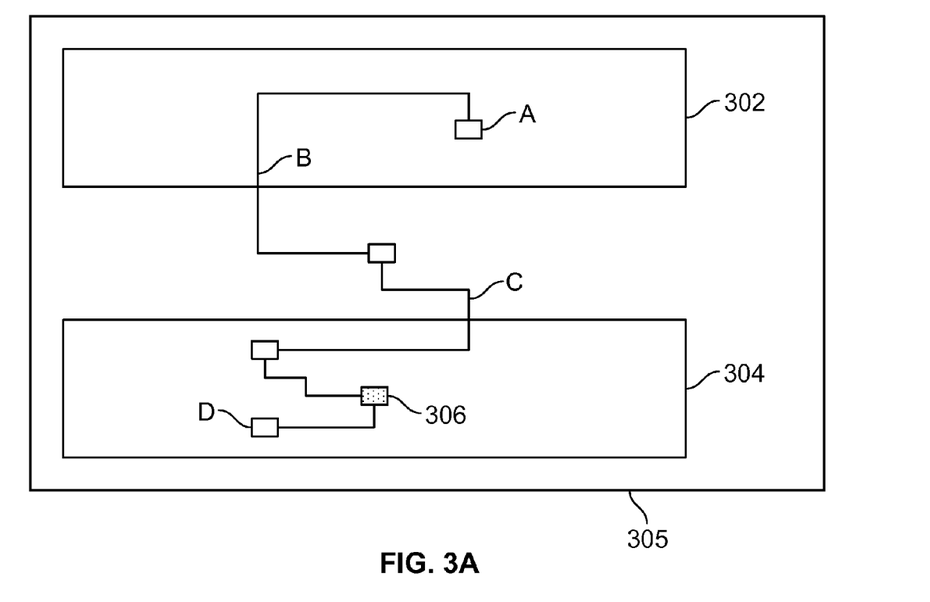
FIGS. 3A-3B are block diagrams of an example circuit design that is processed using a P&R process similar to 200 of FIG. 2.
Figure 3B:
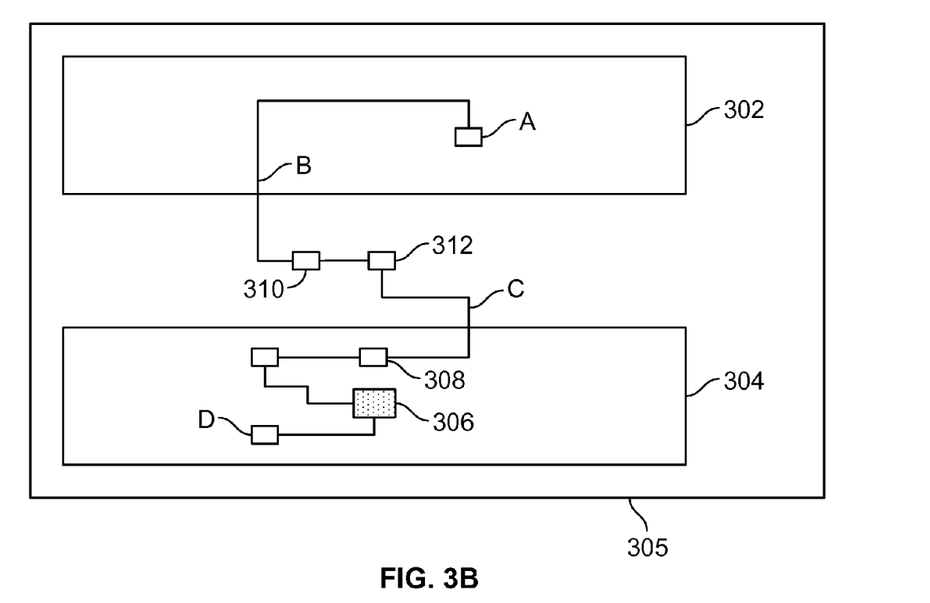

FIGS. 3A-3B are block diagrams of an example circuit design that is processed using a P&R process similar to 200 of FIG. 2. The example assumes that the intra-block timing closure within blocks 302 and 304 have already been achieved, but whether the inter-block timing closure has been achieved is yet to be determined.

In the example shown in FIG. 3A, the boundary net between flip-flops A and D affects inter-block timing. The result of the timing analysis indicates that the inter-block timing constraint has not been met. Thus, top level optimization is performed on the A-D boundary path, and logical fixes are made to the circuitry and are shown in FIG. 3B. Specifically, the size of gate 306 is enlarged, and buffers 308 and 310 are added.

The logical fixes can change the routing pattern and RC tree of the circuit, and consequently change the timing delay. For example, in FIG. 3B, the additions of buffers 308 and 310 break up the circuit paths and, therefore, change the routing pattern, the topology of the RC tree, as well as wire delay. Thus, in some embodiments, RC analysis is also performed to estimate the impact of the modification on routing and to ensure that RC changes due to the routing changes would not cause timing constraints to be exceeded.

Figure 4:
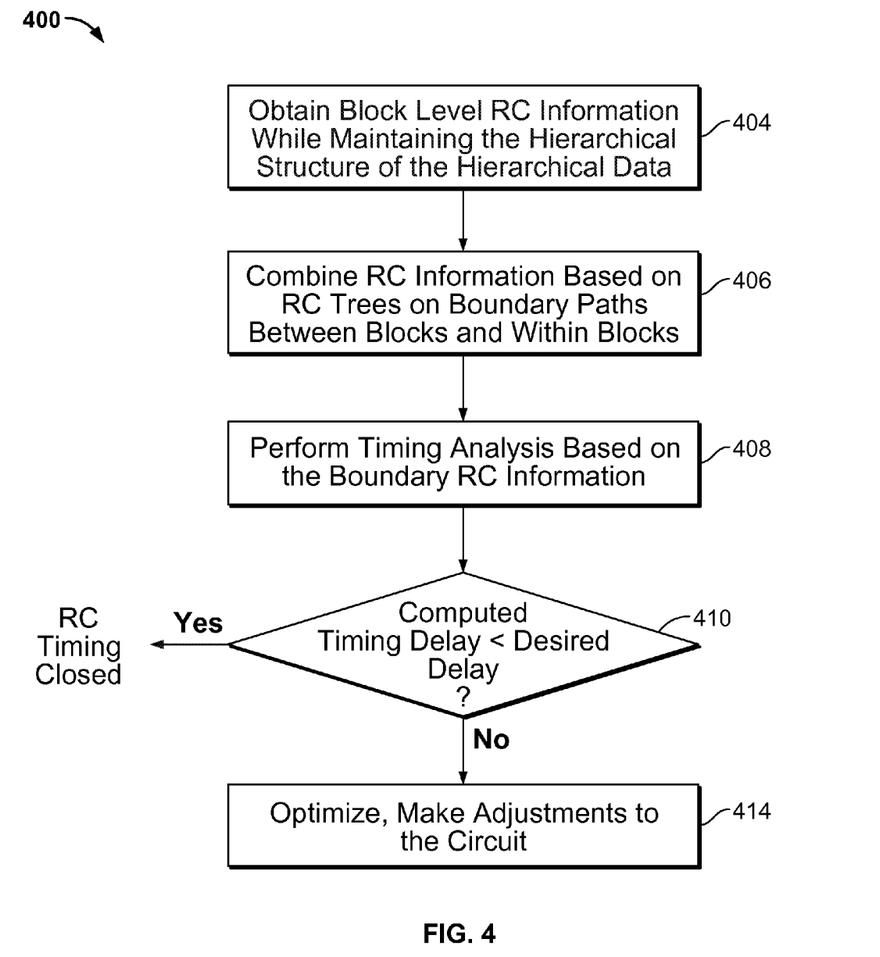
FIG. 4 is a flowchart of an embodiment of an RC analysis process.
Figure 6:
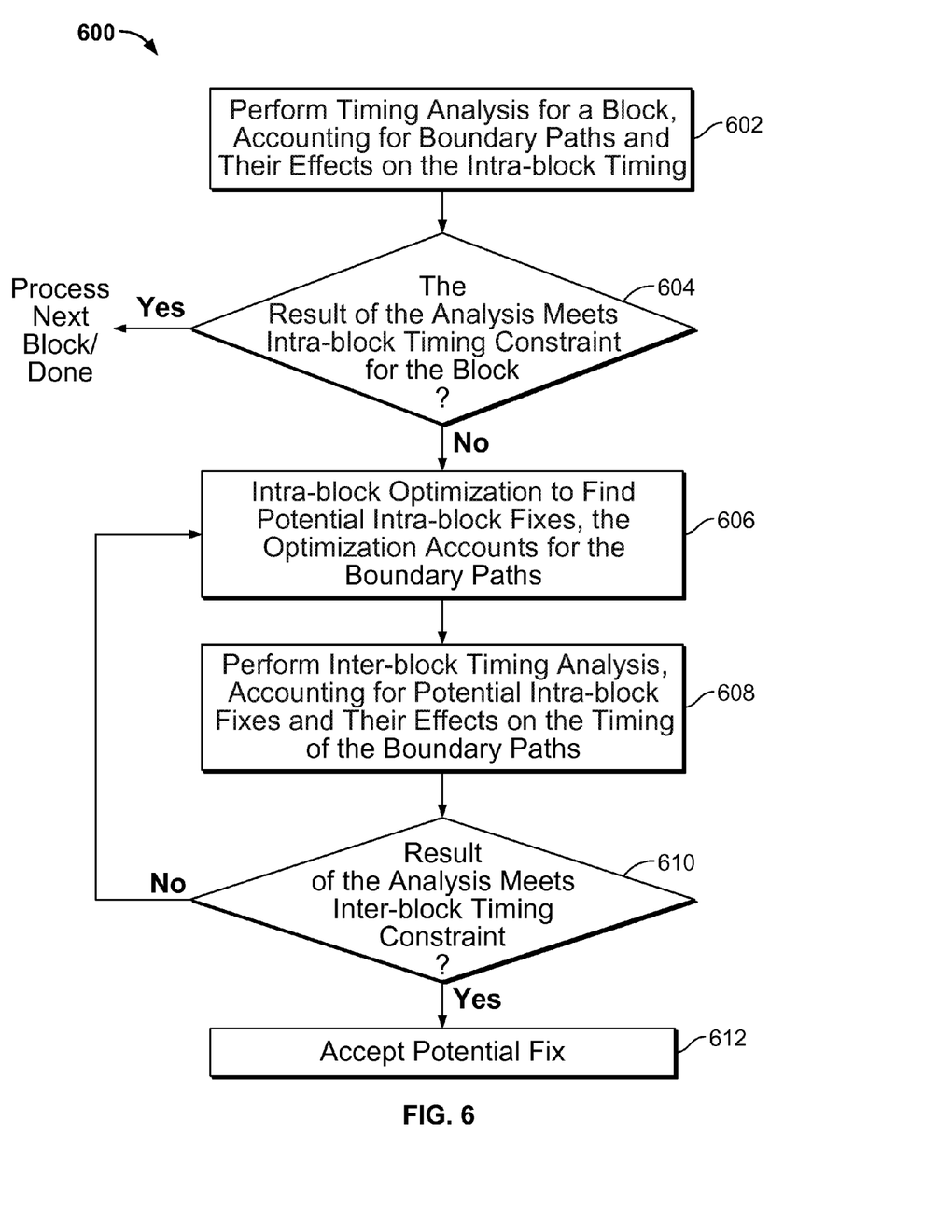
FIG. 6 is a flowchart illustrating an embodiment of a process for achieving intra-block timing closure.

FIG. 4 is a flowchart of an embodiment of an RC analysis process. In some embodiments, process 400 is used as a part of the timing analysis to achieve timing closure. For example, process 400 may be incorporated into 206-210 of process 200 described above, or 608-610 of process 600 described below.

Assuming that hierarchical data has already been accessed, at 404, hierarchical RC information is obtained while maintaining the hierarchical structure of the hierarchical data. In other words, block boundaries are maintained, and hierarchical RC data corresponding to the top level block and lower level blocks remains in the blocks' respective containers. Specifically, boundary RC information based on RC trees on boundary paths between blocks and RC trees on boundary paths within blocks is obtained. Referring to FIG. 3A for an example, the RC tree based on path B-C between blocks 302 and 304 is obtained from the container for top level block 305, and RC trees based on paths A-B and C-D are obtained from containers for lower level blocks 302 and 304, respectively.

At 406, the RC information on boundary paths between blocks and within blocks is combined to generate boundary RC information. In the example of FIG. 3A, the RC tree between path B-C and the RC trees between paths A-B and C-D are combined to generate the boundary RC between A-D.

At 408, RC analysis is performed using the boundary RC information.

At 410, the timing delay resulting from the RC analysis is compared with the desired delay. If the computed delay is less than the desired delay, then the previously made changes for closing inter-block timing have not adversely affected the overall RC delay. RC timing is therefore closed. If, however, the computed delay exceeds the desired delay, further optimization and adjustments to the circuits are made at 414. In some embodiments, process 400 is repeated to make further optimization and netlist changes, until both the timing budget specification and the RC delay are satisfied.

In this case, RC trees that lie entirely within the block and do not cross block boundaries are not used. Since such data amounts to 80% of the overall RC data in some cases, omitting purely intra-block RC information during the analysis greatly reduces the amount of memory required for the analysis. In some embodiments, only the boundary paths with modified netlists that would result in changes to the RC tree are selected for analysis and modification, thus further reducing the amount of data required.

Figure 5A:
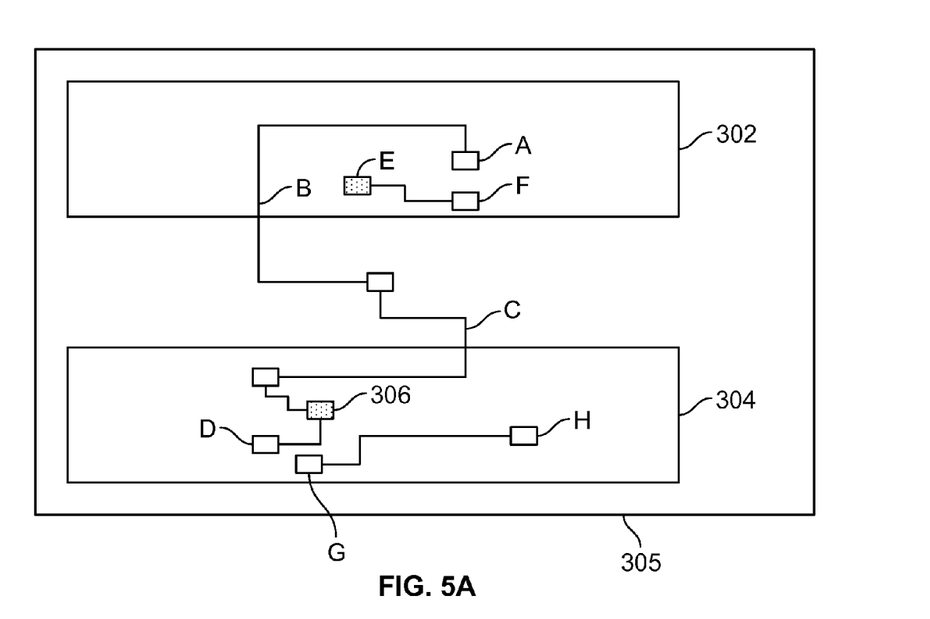
FIGS. 5A-5B are block diagrams illustrating an example circuit design in which intra-block circuits are affected by modifications made to the boundary circuits.
Figure 5B:
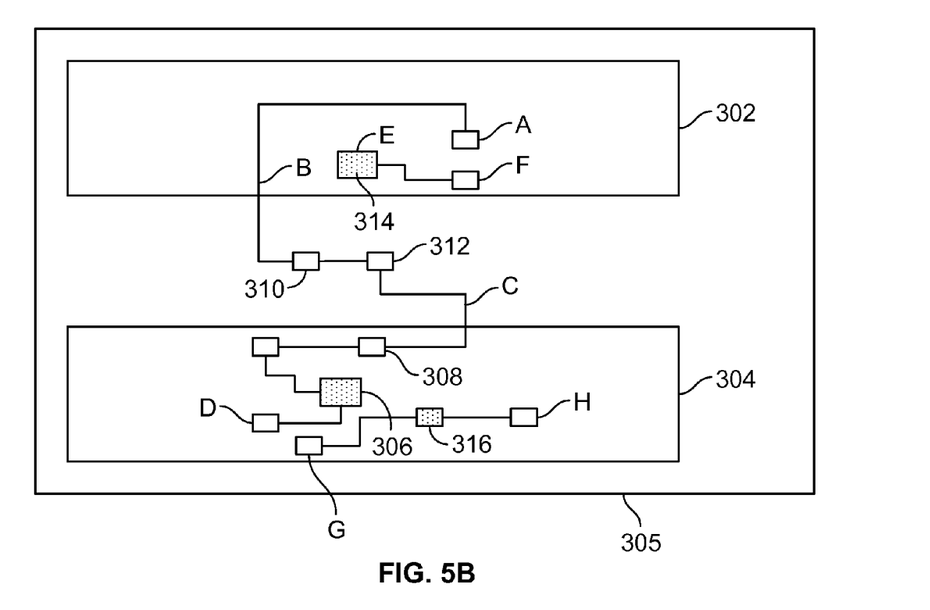

Changes made to the boundary paths for closing inter-block timing can also affect the timing of other intra-block paths, causing additional processing to be required. FIGS. 5A-5B are block diagrams illustrating an example circuit design in which intra-block circuits are affected by modifications made to the boundary circuits. FIG. 5A is similar to FIG. 3A except that in addition to the boundary paths, it also illustrates intra-block paths such as E-F in block 302 and G-H in block 304. Although the inter-block paths and the intra-block paths do not have direct electrical connection to each other, fixes to an inter-block path or a boundary path can change the nearby intra-block paths through coupling capacitances, thus changing the timing of these paths. For example, as shown in FIG. 5B, when an additional buffer 310 is added, intra-block path E-F is affected; when the size for gate 306 is adjusted, intra-block path G-H is affected.

If there is intra-block timing violation in a block, intra-block fixes are made so that modified intra-block paths in the block meet the timing constraints and inter-block paths in proximity to the block preserve their timing. For example, gate 314 on path E-F is resized and an additional buffer 316 is added to path G-H to fix the intra-block timing violations to blocks 302 and 304, respectively. Timing analysis and modifications may be reiterated in some embodiments to achieve timing closure.

FIG. 6 is a flowchart illustrating an embodiment of a process for achieving intra-block timing closure. Process 600 may be performed after inter-block timing closure has been achieved.

At 602, timing analysis is performed for a block. During the analysis, the boundary and inter-block paths are visible and their effects on intra-block timing are accounted for. Referring to FIG. 5A for an example, when block 302 is analyzed, boundary path A-D is visible and inputted to the analysis function, thus the effects of the boundary path on intra-block path E-F's timing is taken into account during the analysis. Similarly, when block 304 is analyzed, A-D is visible, and its effect on intra-block path G-H is accounted for.

Returning to FIG. 6, at 604, the result of the timing analysis is compared with the intra-block timing constraint for the block. If the result meets the intra-block timing constraint, in other words, the fixes made to achieve inter-block timing closure also achieve intra-block timing closure, then no further modification to the block is required and existing modifications to the block are committed. In various implementations, the intra-block timing constraints may come from block level data and/or the top level SDC file. If the blocks are processed serially and there is another block to be processed, control is transferred to 602 to process the next block (not shown). If the process is repeated in parallel for the blocks or if all other blocks have already been processed, the process completes.

If, however, the result does not meet the intra-block timing constraint, at 606, intra-block optimization is performed to find potential intra-block fixes that will meet the constraint. Again, the boundary paths are visible and accounted for during the optimization process to ensure that the intra-block optimization does not introduce further timing violations to the boundary paths. In other words, the process ensures that the intra-block fixes would not cause disturbances to the boundary paths. Specifically, inter-block timing analysis is performed at 608. The analysis takes into account the potential intra-block fixes and their effects on the timing of the boundary paths. The intra-block fixes and the boundary paths are input into the timing analysis function. The inter-block timing analysis result is compared with the circuit's inter-block timing constraint at 610. If the inter-block timing constraint is met, the potential fixes do not disturb inter-block timing and therefore are accepted at 612. The process completes or moves on to process the next block. If, however, the inter-block timing constraint is not met, the potential fixes are rejected, and control is transferred to 606 to perform intra-block optimization again to find new potential fixes. 606-610 are repeated until an acceptable fix is found.

In some embodiments, the circuit design includes multiple instances of a circuit module. The circuit module (also referred to as the master module) can be instantiated (e.g., duplicated, rotated, mirrored, and/or otherwise manipulated) to form multiple circuit instances used to construct a more complex circuit. For example, in a multi-core central processing unit (CPU) design, there are multiple instances of a CPU core module. The interconnections between the instances depend on implementation and can vary in different embodiments. As used herein, matching instances refer to circuit instances derived (or equivalently, instantiated) from the same circuit module, matching components refer to circuit components (e.g., logical components) within circuit instances that correspond to the same component in the circuit module, and matching locations refer to locations in the circuit instances that correspond to the same location in the circuit module. Although the matching instances/components/locations originate from the same circuit module, they may be transformed due to operations such as mirroring, rotating, etc.

Figure 7A:
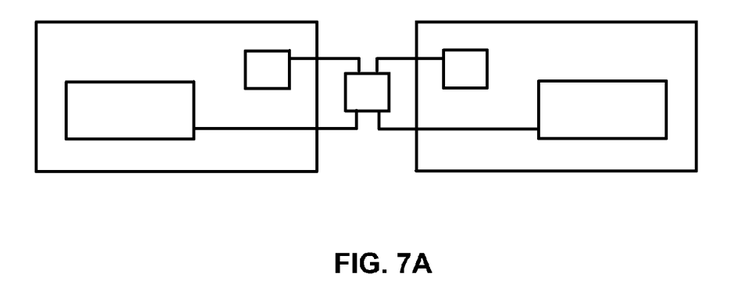
FIGS. 7A-7B are circuit diagrams illustrating embodiments of circuit designs that include multiple instances of a circuit module.
Figure 7B:
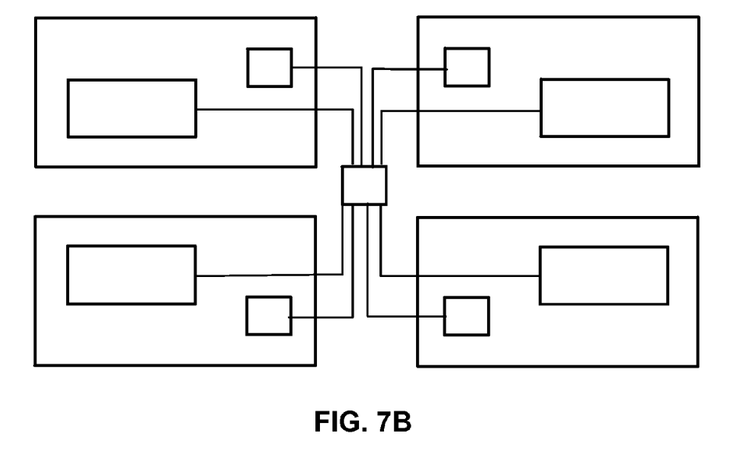

FIGS. 7A-7B are circuit diagrams illustrating embodiments of circuit designs that include multiple instances of a circuit module. In FIG. 7A, two instances of a circuit module are arranged in a mirroring dual-circuit configuration. In FIG. 7B, the instances of the circuit module in FIG. 7A are mirrored again and arranged in a quad-circuit configuration. Each instance forms a low-level block. There are many possible ways of interconnecting the instances, and the actual interconnections can vary for different circuit embodiments.

Figure 8:
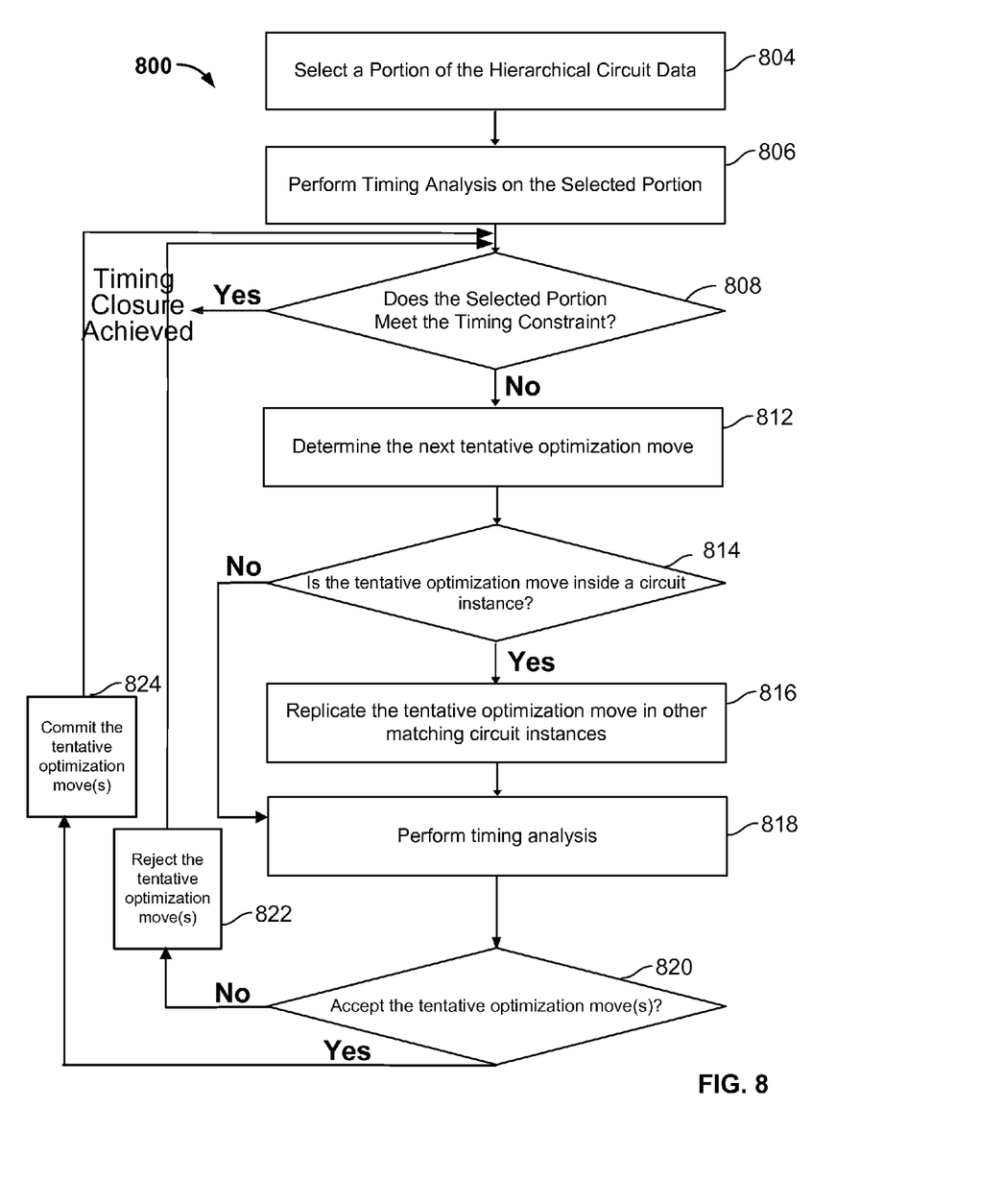
FIG. 8 is a flowchart illustrating another embodiment of an in-hierarchy place and route process.

FIG. 8 is a flowchart illustrating another embodiment of an in-hierarchy place and route process for achieving timing closure. Process 800 can be performed on a computer system or any other appropriate device and can be used to implement 184 of process 180. Process 800 is applied to a hierarchical circuit design that includes multiple circuit instances derived from the same circuit module.

At 804, a portion of the hierarchical circuit data is selected for timing analysis. In some embodiments, the selected portion of the hierarchical circuit data includes a selected portion of the top level data and a selected portion of the lower level block data (e.g., boundary path data that includes top level data of path portions between blocks and lower level block data of path portions within blocks). In some cases, the focus is to fix timing violations of the boundary paths, thus the selected portion includes boundary path data only and excludes data for paths that only connect components in the top level (i.e., outside the blocks). In some cases, boundary path data as well as data for paths that only connect components in the top level are included in the selected portion to facilitate timing violation fixes for paths affecting the top level.

At 806, timing analysis is performed on the selected portion of the hierarchical data. Similar to process 200 discussed above, in some embodiments, the timing analysis is based on the netlist corresponding to the selected portion. STA, RC analysis, and/or other known timing analysis techniques can be used.

At 808, based on the result of the timing analysis, it is determined whether the selected portion of the hierarchical data meets the desired timing constraints (e.g., the top level SDC). If the desired timing constraint is met (e.g., all the paths in the selection achieve timing closure), process 800 terminates. If, however, the desired timing constraint is not met (e.g., at least some of the boundary paths do not achieve timing closure), one or more logical fixes are determined within the top level design process on the selected portion of the hierarchical circuit data, as described below.

At 812, a tentative optimization move (also referred to as a fix or a logical fix) is determined. In some embodiments, a set of rules are applied to determine the next tentative optimization move. Examples of an optimization move include adding a buffer to the output of the path with the worst timing, doubling the gate size of the smallest cell, swapping a standard-VT cell with a low-VT cell to reduce the path delay, etc. A variety of known rules can be used. In some embodiments, the techniques for determining the tentative optimization move are similar to the optimization and modification techniques described above in connection with 210 of FIG. 2. Any appropriate techniques known to those skilled in the art can be used. Similar to process 200 discussed above, the optimization moves are determined within the top level design process and do not require an ECO.

At 814, it is determined whether the tentative optimization move is inside a circuit instance. If the optimization move is within a circuit instance (i.e., the fix is an intra-block fix), the fix is replicated in other circuit instances derived from the same circuit module, at 816. For example, if the fix involves adding a buffer within a circuit instance, then buffers are also added in matching locations of other circuit instances. If a component is resized, then the matching components in matching instances are also resized in the same way. If the optimization move is between the circuit instances (i.e., the fix is inter-block), it is not replicated in other circuit instances, and control proceeds to 818 of process 800.

At 818, timing analysis is performed on the circuit which includes the tentative optimization move, as well as the replicated tentative optimization moves if such replicated fixes are made. STA, RC analysis, and/or other known timing analysis techniques can be used.

At 820, it is determined whether the tentative optimization move and any replicated tentative optimization moves should be accepted. In some embodiments, a set of acceptance criteria is applied. Examples of the acceptance criteria includes whether the tentative fix and any replicated tentative optimization moves improve timing locally for a particular path, whether the tentative fix and any replicated tentative optimization moves improve timing for specific paths such as all the boundary paths, etc. In some embodiments, the worst negative slack (WNS) which is the timing metric of a particular path in focus and the total negative slack (TNS) which is the overall timing metric of all the paths under evaluation are evaluated to determine whether there are improvements. If WNS improves and TNS does not get worse, then the fixes are accepted. Many known acceptance criteria and known determination techniques can be used and the implementations may vary for different embodiments.

If it is determined that the tentative optimization move (and replicated tentative optimization moves if made) should not be accepted, then all the fixes are rejected at 822. If, however, it is determined that the tentative optimization move (and replicated tentative optimization moves if made) should be accepted, then fixes are committed at 824. In other words, the fixes are accepted or incorporated into the hierarchical design.

Subsequent to 824 or 822, the process returns 808, where the timing analysis result from 818 is used to determine whether the selected portion meets the timing constraint. The process is repeated starting at 808 until timing closure is achieved for the selected portion (in other words, until all the paths in the set of similar paths meet the timing requirement).

Figure 9A:
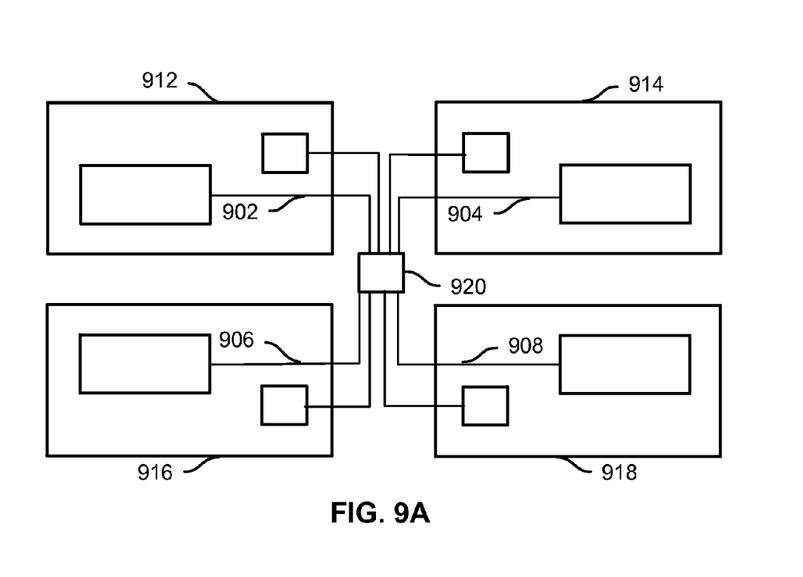
FIGS. 9A-9B are block diagrams illustrating another embodiment of a circuit design comprising multiple circuit instances derived from the same circuit module.
Figure 9B:
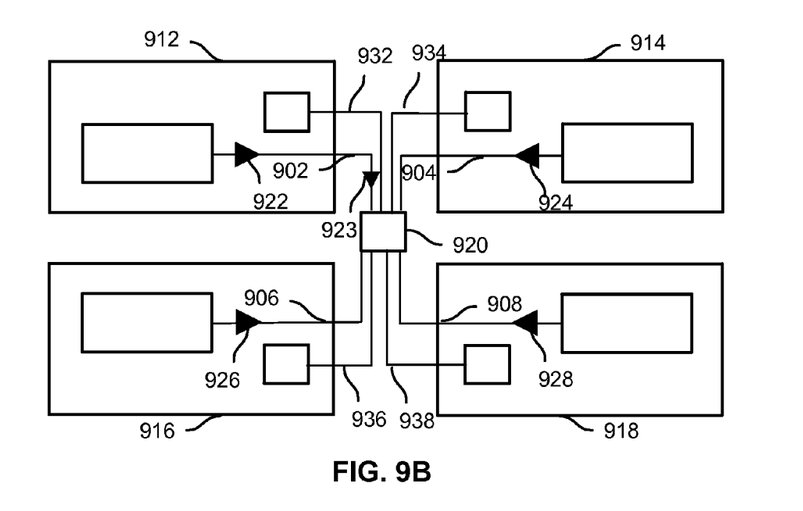

FIGS. 9A-9B are block diagrams illustrating another embodiment of a circuit design comprising multiple circuit instances derived from the same circuit module. Process 800 is explained in connection with FIGS. 9A-9B. In the example shown in FIG. 9A, boundary paths 902, 904, 906, and 908 are a set of similar boundary paths that cross the boundaries of blocks (circuit instances). They originate from matching pins on matching logical components within circuit instances 912, 914, 916, and 918, respectively, and terminate in different pins of component 920 which is located outside the circuit instances. Due to differences in wire length, the setup time delays of path 902, 904, 906, and 908 are 1.2 ns, 1.1 ns, 1.1 ns, and 1.0 ns, respectively. The required setup time delay is 0.9 ns in this example.

Process 800 is applied. According to 804 of process 800, a portion of the circuit, specifically the circuit portion that includes paths 902-908, is selected. Timing analysis is performed according to 806. According to 808 of process 800, it is determined that the timing constraint is not met because the setup time delays exceed the required setup time delay. According to 812, a tentative optimization move is determined. Specifically, as shown in FIG. 9B, the tentative optimization move includes adding a buffer 922 inside circuit instance 912. According to 814, it is determined whether the tentative logic fix is inside a circuit instance. In this case, the tentative optimization move of adding buffer 922 is within a circuit instance 912. Accordingly, at 816, the tentative optimization move of adding such a buffer is replicated in other circuit instances (e.g., buffers 924, 926, and 928 in circuit instances 914, 916, and 918, respectively). Timing analysis is performed at 818. The set of acceptance criteria is applied at 820 to determine whether the tentative optimization moves should be accepted. Depending on the outcome of the determination, all the fixes are accepted (i.e., committed) at 824, or rejected at 822.

In this example, at 808, it is determined that, based on the timing analysis result of 818, the timing constraint is still not met. At 812, the next tentative optimization move is determined. Specifically, the next tentative optimization move includes adding a buffer 923 outside circuit instance 912. At 814, it is determined that the tentative optimization move of adding the buffer is not inside a circuit instance. Accordingly, this fix is not replicated. At 818, timing analysis 818 is performed. The set of acceptance criteria is applied to determine whether to accept this tentative optimization move, at 820. Depending on the outcome of the determination, the tentative optimization move is either committed at 824 or rejected at 822. The process repeats at 808, until timing closure is achieved.

Modifying a hierarchical circuit design to achieve timing closure has been disclosed. By maintaining the hierarchical data structure and using selective portions of data for processing, greater computational efficiency is achieved. By using a unified process that accesses and modifies data that has a consistent format throughout, manual intervention is avoided and turn-around time is improved. By replicating fixes in circuit instances derived from the same circuit module, the amount of computation needed to meet timing requirements is greatly reduced.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
within a top level design process performed using one or more computer processors:
   accessing hierarchical circuit data in a hierarchical circuit design comprising top level block data and lower level block data, the hierarchical circuit design being used to produce a chip;
   performing timing analysis on a selected portion of the hierarchical circuit data to determine whether timing closure is achieved; and
   in the event that timing closure is not achieved, determining an optimization move on the selected portion of the hierarchical circuit data; wherein
the selected portion of the hierarchical circuit data includes a selected portion of the top level block data and a selected portion of the lower level block data; and
the hierarchical circuit data is not exported or imported between the performing of the timing analysis and the determining of the optimization move.

2. The method of claim 1, wherein the hierarchical circuit design comprises a plurality of circuit instances derived from a circuit module.

3. The method of claim 2, wherein the selected portion of the hierarchical circuit data includes a set of boundary path data.

4. The method of claim 2, wherein the optimization move is a committed optimization move, and determining the committed optimization move on at least a part of the selected portion of the hierarchical circuit data includes:
   determining a tentative optimization move; and determining whether the tentative optimization move is inside a circuit instance of the plurality of circuit instances derived from the circuit module.

5. The method of claim 4, wherein in the event that the tentative optimization move is determined to be inside the circuit instance of the plurality of circuit instances, the method further comprises replicating the tentative optimization move in another one of the plurality of circuit instances derived from the circuit module.

6. The method of claim 5, further comprising determining whether to commit the tentative optimization move and the replicated tentative optimization move.

7. The method of claim 4, further comprising determining whether to commit the tentative optimization move.

8. The method of claim 7, further comprising determining that the tentative optimization move is to be committed.

9. The method of claim 8, further comprising:
performing a second timing analysis on the selected portion of the hierarchical circuit data that includes the committed optimization move; and
in the event that timing closure is not achieved based on a result of the second timing analysis, determining a next optimization move on the selected portion of the hierarchical circuit data.

10. The method of claim 4, wherein in the event that the tentative optimization move is determined to be outside the circuit instance of the plurality of circuit instances, the tentative optimization move is not replicated in another circuit instance of the plurality of circuit instances.

11. A system comprising:
one or more processors configured to:
within a top level design process:
access hierarchical circuit data in a hierarchical circuit design comprising top level block data and lower level block data, the hierarchical circuit design being used to produce a chip;
perform timing analysis on a selected portion of the hierarchical circuit data to determine whether timing closure is achieved; and
in the event that timing closure is not achieved, determine level design process, an optimization move on the selected portion of the hierarchical circuit data; wherein
the selected portion of the hierarchical circuit data includes a selected portion of the top level block data and a selected portion of the lower level block data; and
the hierarchical circuit data is not exported or imported between the performing of the timing analysis and the determining of the optimization move; and
one or more memories coupled to the one or more computer processors, configured to provide the one or more processors with instructions.

12. The system of claim 11, wherein the hierarchical circuit design comprises a plurality of circuit instances derived from a circuit module.

13. The system of claim 12, wherein the selected portion of the hierarchical circuit data includes a set of boundary path data.

14. The system of claim 12, wherein the optimization move is a committed optimization move, and to determine the committed optimization move on at least a part of the selected portion of the hierarchical circuit data includes to:
determine a tentative optimization move; and
determine whether the tentative optimization move is inside a circuit instance of the plurality of circuit instances derived from the circuit module.

15. The system of claim 14, wherein in the event that the tentative optimization move is inside the circuit instance of the plurality of circuit instances, the one or more processors are further configured to replicate the tentative optimization move in another one of the plurality of circuit instances derived from the circuit module.

16. The system of claim 15, wherein the one or more processors are further configured to determine whether to commit the tentative optimization move and the replicated tentative optimization move.

17. The system of claim 14, wherein the one or more processors are further configured to determine whether to commit the tentative optimization move.

18. The system of claim 17, wherein the one or more processors are further configured to determine that the tentative optimization move is to be committed.

19. The system of claim 18, wherein the one or more processors are further configured to:
perform a second timing analysis on the selected portion of the hierarchical circuit data that includes the committed optimization move; and
in the event that timing closure is not achieved based on a result of the second timing analysis, determine a next optimization move on the selected portion of the hierarchical circuit data.

20. The system of claim 14, wherein in the event that the tentative optimization move is outside the circuit instance of the plurality of circuit instances, the tentative optimization move is not replicated in another circuit instance of the plurality of circuit instances.

21. A computer program product for modifying a hierarchical circuit design, the computer program product being embodied in a non-transitory computer readable storage medium and comprising computer instructions for:
within a top level design process:
accessing hierarchical circuit data in a hierarchical circuit design comprising top level block data and lower level block data, the hierarchical circuit design being used to produce a chip;
performing timing analysis on a selected portion of the hierarchical circuit data to determine whether timing closure is achieved; and
in the event that timing closure is not achieved, determining a set of one or more fixes on at least a part of the selected portion of the hierarchical circuit data; wherein
the selected portion of the hierarchical circuit data includes a selected portion of the top level block data and a selected portion of the lower level block data; and
the hierarchical circuit data is not exported or imported between the performing of the timing analysis and the determining of the optimization move.

* * * * *